United States Patent [19]
Yatagai

[11] Patent Number: 5,717,761
[45] Date of Patent: Feb. 10, 1998

[54] DATA TRANSMISSION SYSTEM CAPABLE OF CARRYING OUT A DATA TRANSMISSION WITH A HIGH SECURITY

[75] Inventor: Chinami Yatagai, Tokyo, Japan

[73] Assignee: NEC Corporation, Tokyo, Japan

[21] Appl. No.: 587,363

[22] Filed: Jan. 16, 1996

[30] Foreign Application Priority Data

Jan. 13, 1995 [JP] Japan ................................. 7-003978

[51] Int. Cl.$^6$ .............................. H04L 9/00; H04J 3/06
[52] U.S. Cl. .................... 380/48; 380/49; 370/509; 370/514; 375/365
[58] Field of Search ..................... 380/48, 49; 370/509, 370/514; 375/365, 368

[56] References Cited

U.S. PATENT DOCUMENTS

| | | | |
|---|---|---|---|
| 5,007,088 | 4/1991 | Ooi et al. | 380/46 |
| 5,229,997 | 7/1993 | Hirata et al. | 370/104.1 |

FOREIGN PATENT DOCUMENTS

60-22754  11/1985  Japan .

*Primary Examiner*—Thomas H. Tarcza
*Assistant Examiner*—Carmen D. White
*Attorney, Agent, or Firm*—Ostrolenk, Faber, Gerb & Soffen, LLP

[57] ABSTRACT

A transmission section is responsive to first through K-th data signals to transmit a transmission signal through a transmission path to a reception section. The transmission signal has first through K-th frames which carry said first through said K-th data signals and first through K-th transmission unique words, respectively, where K represents a positive integer which is greater than one. The transmission section comprises a first producing section for producing the first through the K-th transmission unique words in accordance with a predetermined unique word and each of first through K-th specific patterns and a second producing section for producing the transmission signal in accordance with the first through the K-th transmission unique words and the first through the K-th data signals. The first through the K-th transmission unique words are different from one another. The reception section is responsive to a recetion signal based on the transmission signal to produce the transmission signal to produce the first through the K-th data signal after establishing a frame synchroniza-tion in accordance with the first through the K-th transmission unique words.

15 Claims, 4 Drawing Sheets

DATA TRANSMISSION SYSTEM CAPABLE OF CARRYING OUT A DATA TRANSMISSION WITH A HIGH SECURITY

BACKGROUND OF THE INVENTION

This invention relates to a data transmission system for carrying out a data transmission under a frame synchronization.

In general, a data transmission system comprises a transmission section and a reception section connected to the transmission section through a transmission path. The transmission section is responsive to first through K-th data signals to transmit a transmission signal to the reception section, where K represents a positive integer which is greater than one. The transmission signal has first through K-th frames which carry the first through the K-th data signals, respectively. Each of the first through the K-th frames carries a unique word followed by each of the first through the K-th data signals.

The reception section is responsive to a reception signal based on the transmission signal to produce the first through the K-th data signals. More particularly, the reception section detects the unique word in the reception signal to establish a frame synchronization. After establishing the frame synchronization, the reception section produces the first through the K-th data signals in accordance with the reception signal.

Such a data transmission system is disclosed in Japanese Unexamined Patent Publication Tokkai Syo 60-227542 (227542/1985) as a conventional data transmission system.

In the conventional data transmission system, the transmission section produces the transmission signal having a predetermined unique word. More specifically, each of the first through the K-th frames carries the predetermined unique word in the transmission signal.

In order to establish the frame synchronization, the reception section detects the predetermined unique word in the reception signal in accordance with a reception unique word equal to the predetermined unique word.

As described above, it is possible to obtain the first through the K-th data signals after detecting the predetermined unique word in the reception signal inasmuch as each of the first through the K-th frames carries the predetermined unique word.

In case where the predetermined unique word is detected in the reception signal in another reception section, it is possible to receive the transmission signal in order to obtain the first through the K-th data signals. Therefore, the conventional data transmission system has a low security.

SUMMARY OF THE INVENTION

It is therefore an object of this invention to provide a data transmission system capable of carrying out a data transmission with a high security.

Other objects of this invention will become clear as the description proceeds.

On describing the gist of this invention, it is possible to understand that a data transmission system comprises a transmission section and a reception section connected to said transmission section through a transmission path. The transmission section is responsive to first through K-th data signals to transmit a transmission signal to the reception section, where K represents a positive integer which is greater than one. The reception section produces the first through the K-th data signals in accordance with a reception signal based on the transmission signal.

According to this invention, the transmission signal has first through K-th frames which carry the first through the K-th data signals and first through K-th transmission unique words, respectively. The transmission section comprises first producing means for producing the first through the K-th transmission unique words in accordance with a predetermined unique word and each of first through K-th specific patterns and second producing means for producing the transmission signal in accordance with the first through the K-th transmission unique words and the first through the K-th data signals.

DESCRIPTION OF THE PREFERRED EMBODIMENTS

Figure 1:
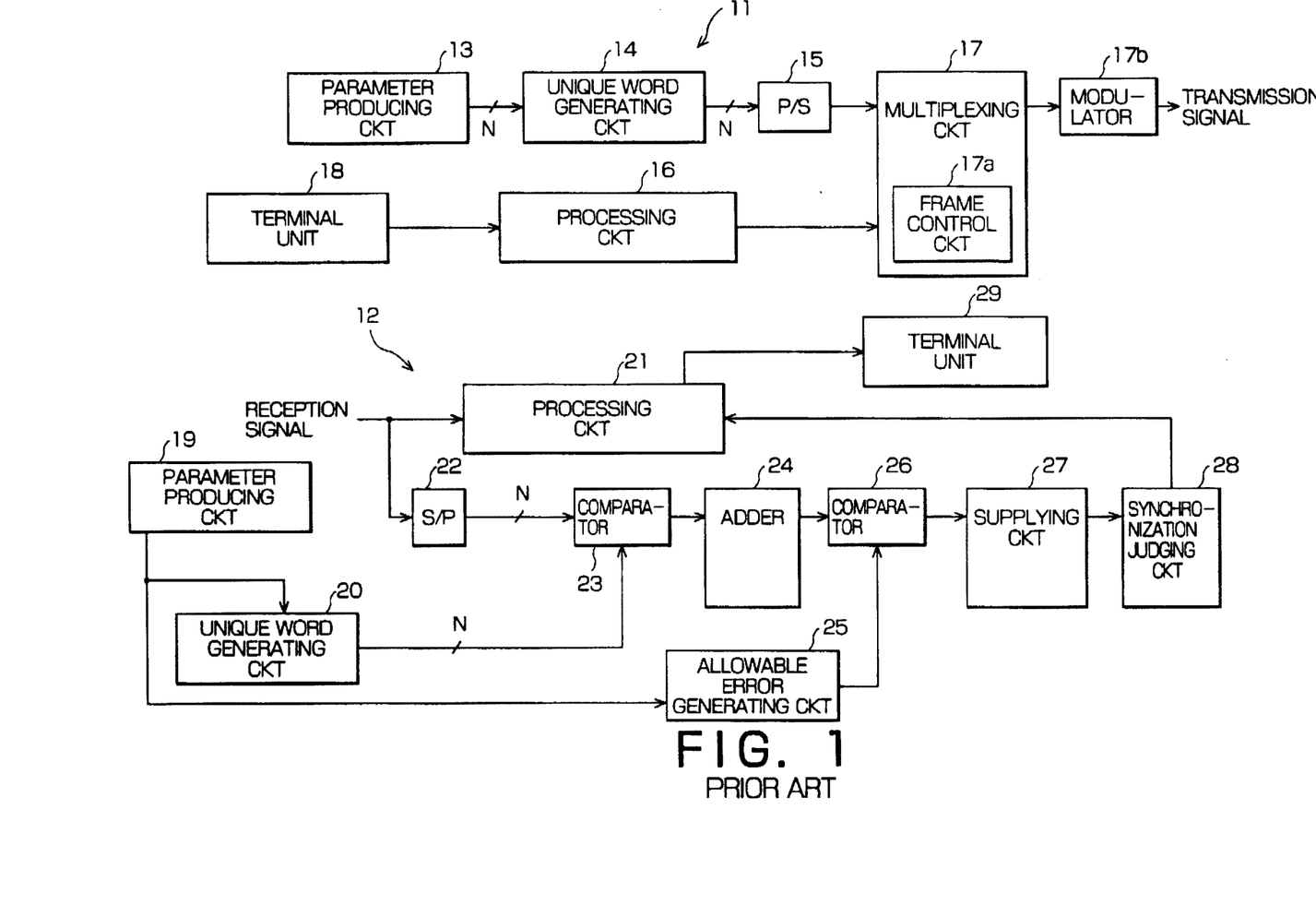
FIG. 1 is a block diagram of a conventional data transmission system.

Referring to FIG. 1, description will first be made as regards a conventional data transmission system for a better understanding of this invention. The data transmission system comprises a transmission section 11 and a reception section 12. The transmission section 11 is connected to the reception section 12 through a transmission path which may be, for example, a radio channel. The transmission section 11 is responsive to a data signal sequence to transmit a transmission signal to the reception section 12 through the transmission path. During transmission, the transmission signal may be inevitably subjected to a fading. The reception section 12 receives the transmission signal to produce a reception signal. The reception section 12 produces the data signal sequence in accordance with the reception signal.

The data signal sequence may be composed of first through K-th data signal, where K represents a positive integer which is greater than one. The transmission signal has first through K-th frames which carry the first through the K-th data signals. Furthermore, each of the first through the K-th frames carries a predetermined unique word of N bits, where N represents a positive integer which is greater than one. The predetermined unique word is followed by first through the K-th data signals in the first through the K-th frames, respectively.

The transmission section 11 comprises a transmission parameter producing circuit 13, a transmission unique word generating circuit 14, a parallel-serial (P/S) converter 15, a transmission processing circuit 16, and a multiplexing circuit 17. The transmission section 11 is connected to a transmission terminal unit 18 which supplies the transmission section 11 with the data signal sequence.

The parameter producing circuit 13 may be, for example, a central processing unit (CPU). The parameter producing circuit 13 is for use in supplying the unique word generating circuit 14 with a transmission parameter of N bits. Responsive to the transmission parameter, the unique word generating circuit 14 generates a predetermined unique word of N bits in parallel to supply the predetermined unique word to the parallel-serial converter 15. The parallel-serial converter 15 converts the predetermined unique word to a serial unique word. The serial unique word is delivered to the multiplexing circuit 17.

On the other hand, the data signal sequence is supplied from the transmission terminal unit 18 to the transmission processing circuit 16. Responsive to the data signal sequence, the transmission processing circuit 16 processes the data signal sequence into a processed data signal sequence. The processed data signal sequence is delivered to the multiplexing circuit 17.

Supplied with the serial unique word and the processed data signal sequence, the multiplexing circuit 17 multiplexes the serial unique word to the processed data signal sequence to produce a multiplexed signal. More specifically, the multiplexing circuit 17 comprises a frame control unit 17a. Under the control of the frame control unit 17a, the multiplexing circuit 17 locates the serial unique word to the head of each of the first through the K-th data signals to produce the multiplexed signal having first through the K-th frames. The multiplexed signal is modulated into the transmission signal by a modulator 17b.

The transmission signal is received at the reception section 12 to be demodulated into the reception signal. The reception section 12 comprises a reception parameter producing circuit 19, a reception unique word generating circuit 20, a reception processing circuit 21, a serial-paralell (S/P) converter 22, a first comparator circuit 23, an adder circuit 24, an allowable error generating circuit 25, a second comparator circuit 26, a transmission supplying circuit 27, and a synchronization judging circuit 28. The reception section 12 is connected to a reception terminal unit 29.

In the reception section 12, the reception signal is supplied to the reception processing circuit 21 and the serial-parallel converter 22. Responsive to the reception signal, the serial-parallel converter 22 carries out a serial-parallel conversion to successively produce an input signal of N bits. The input signal is supplied from the serial-parallel converter 22 to the first comparator circuit 23.

The reception parameter producing circuit 19 may be, for example, a central processing unit (CPU). The reception parameter producing circuit 19 supplies the reception unique word generating circuit 20 with a reception parameter which is equal to the transmission parameter. Responsive to the reception parameter, the reception unique word generating circuit 20 generates a reception unique word of N bits in paralell. The reception unique word is equal to the transmission unique word. The reception unique word is supplied from the reception unique word generating circuit 20 to the first comparator circuit 23.

The first comparator circuit 23 compares the input signal with the reception unique word at each bit. Whenever a bit error exists at each bit between the input signal and the reception unique word, the first comparator circuit 23 produces a first error signal representative of the bit error between the input signal and the reception unique word. The first error signal is supplied from the first comparator circuit 23 to the adder circuit 24. The adder circuit 24 counts the first error signal to calculate a sum of bit errors. The adder circuit 24 supplies the second comparator circuit 26 with a sum error signal representative of the sum number of the bit errors.

The reception parameter producing circuit 19 supplies the reception parameter to the allowable error generating circuit 25 so that the allowable error generating circuit 25 generates an allowable error signal representative of the allowable number of allowable errors. The allowable error signal is supplied from the allowable error generating circuit 25 to the second comparator circuit 26.

The second comparator circuit 26 compares the sum error signal with the allowable error signal. When the sum number of the bit errors is not greater than the allowable number of the allowable errors, the second comparator circuit 26 supplies a comparison result signal to the reception supplying circuit 27. Responsive to the comparison result signal, the reception supplying circuit 27 supplies a unique word detecting signal or pulse to synchronization judging circuit 28.

As readily understood from the above description, the reception supplying circuit 27 produces the unique word detection pulse whenever the predetermined unique word is detected at each of the first through the K-th frames.

Once the unique word detection pulse is supplied to the synchronization judging circuit 28, the synchronization judging circuit 28 supplies the reception processing circuit 21 with a synchronization mode signal representative of a synchronization mode after a post guard time duration lapses. The synchronization mode signal is supplied from the synchronization judging circuit 28 to the reception processing circuit 21. Responsive to the synchronization mode signal, the reception processing circuit 21 operates at the synchronization mode to process the reception signal into a processed reception signal which may be collectively called the first through the K-th data signals. The processed reception signal is supplied to the reception terminal unit 29.

When the unique word is not detected, the reception supplying circuit 27 does not produce the unique word detection pulse. Under the synchronization mode, the synchronization judging circuit 28 produces a non-synchronization mode signal when the unique word detecting pulse is not supplied to the synchronization judging circuit 28 during a pre-guard time duration. Responsive to the non-synchronization mode signal, the reception processing circuit 21 is put out of operation.

As described above, it is possible to obtain the first through the K-th data signals after detecting the predetermined unique word in the transmission signal inasmuch as each of the first through the K-th frames carries the predetermined unique word. In case where the predetermined unique word is detected in the transmission signal in another reception section, it is possible to receive the transmission signal in order to obtain the first through the K-th data signals. Therefore, the conventional data transmission system has a low security.

Figure 2:
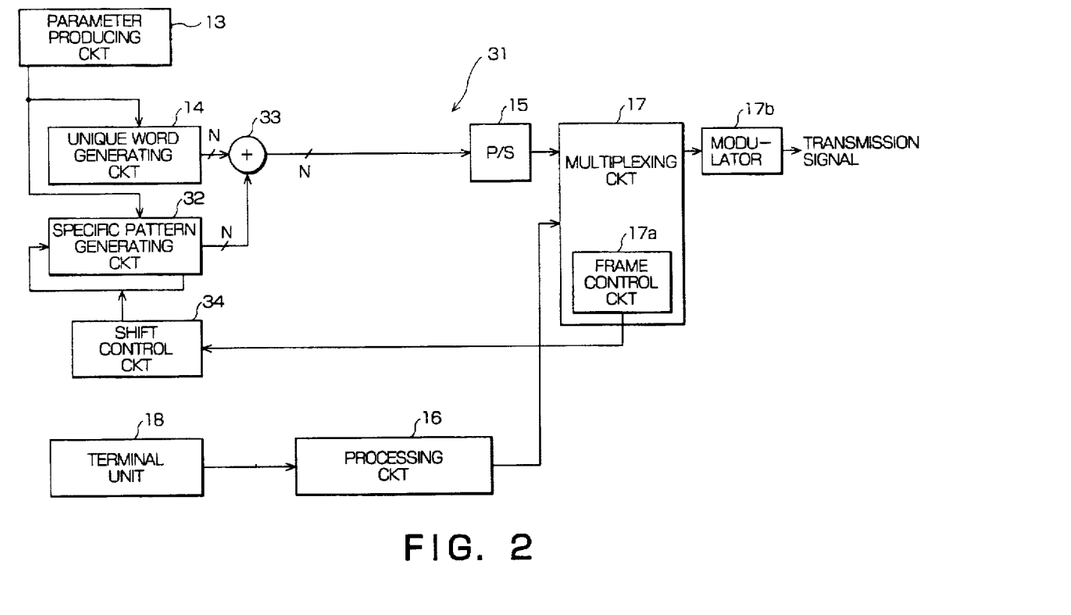
FIG. 2 is a block diagram of a transmission section of a data transmission system according to a first embodiment of this invention.

Referring to FIG. 2, description will proceed to a data transmission system according to a first embodiment of this invention. At first, attention will be directed to a transmission section of the data transmission system. The illustrated transmission section is different in structure from the transmission section 11 illustrated in FIG. 1 and is therefore designated by a reference numeral 31. The transmission section 31 comprises similar parts which are designated by like reference numerals and are operable with likewise named and denoted signals.

The transmission section 31 further comprises a transmission specific pattern generating circuit 32, an exclusive OR (EX-OR) circuit 33, and a shift control circuit 34. The transmission section 31 is connected to the transmission terminal unit 18.

As described in conjunction to FIG. 1, the transmission unique word generating circuit 14 generates the predetermined unique word of N bits in accordance with the transmission parameter supplied with the transmission parameter producing circuit 13. The transmission parameter is further supplied to the transmission specific pattern generating circuit 32. Responsive to the transmission parameter, the transmission specific pattern generating circuit 32 generates a particular pattern of N bits that is different from the predetermined unique word. The particular unique word is delivered as a first specific pattern to the EX-OR circuit 33.

The EX-OR circuit 33 carries out an EX-OR between the predetermined unique word and the first specific pattern at each bit to produce a first unique word.

The parallel-serial converter 15 carries out the parallel-serial conversion to supply the first unique word as a first transmission unique word to the multiplexing circuit 17.

From the transmission terminal unit 18, the transmission processing circuit 16 is supplied with the data signal sequence. The transmission processing circuit 16 processes the data signal sequence into the processed data signal sequence to supply the processed data signal sequence to the multiplexing circuit 17.

Under control of the frame control unit 17a, the multiplexing circuit 17 multiplexes the first transmission unique word to the first data signal of the data signal sequence. More particularly, the multiplexing circuit 17 locates the first transmission unique word to the head of the first data signal of the processed data signal sequence under control of the frame control unit 17a.

After the first transmission unique word is multiplexed to the first data signal, the frame control unit 17a supplies a shift control signal to the shift control circuit 34.

Responsive to the shift control signal, the shift control circuit 34 controls the transmission specific pattern generating circuit 32 to carry out a shift of one bit in the first specific pattern. As a result, the transmission specific pattern generating circuit 32 produces a second specific pattern which is different from the first specific pattern. The second specific pattern is supplied to the EX-OR circuit 33 in order to be subjected to the EX-OR between the second specific pattern and the predetermined unique word.

The EX-OR circuit 33 produces a second unique word in accordance with the second specific pattern and the predetermined unique word. The second unique word is converted into a second transmission unique word by the parallel-serial converter 15 to be supplied to the multiplexing circuit 17.

Under the control of the frame control unit 17a, the multiplexing circuit 17 locates the second transmission unique word to the head of the second data signal of the processed data signal sequence. After multiplexing the second transmission unique word to the second data signal, the frame control circuit 17a supplies the shift control signal to the shift control circuit 34.

Responsive to the shift control signal, the shift control circuit 34 controls the transmission specific pattern generating circuit 32 to carry out the shift of one bit in the second specific pattern. As a result, the transmission specific pattern generating circuit 32 produces a third specific pattern which may be different from each of the first and second specific patterns.

In a manner similar to the above description, the transmission specific pattern generating circuit 32 produces fourth through K-th specific patterns at the frame period. As a result, fourth through K-th transmission unique words are located to the heads of the fourth through the K-th data signals in the multiplexing circuit 17, respectively.

As readily understood from the above description, the multiplexing circuit 17 produces the multiplexed signal having first through the K-th frames. The first frame carries the first transmission unique word and the first data signal. The second frame carries the second transmission unique word and the second data signal. Similarly, the K-th frame carries the K-th transmission unique word and the K-th data signal. The first through the K-th unique words may be different from one another.

Figure 3:
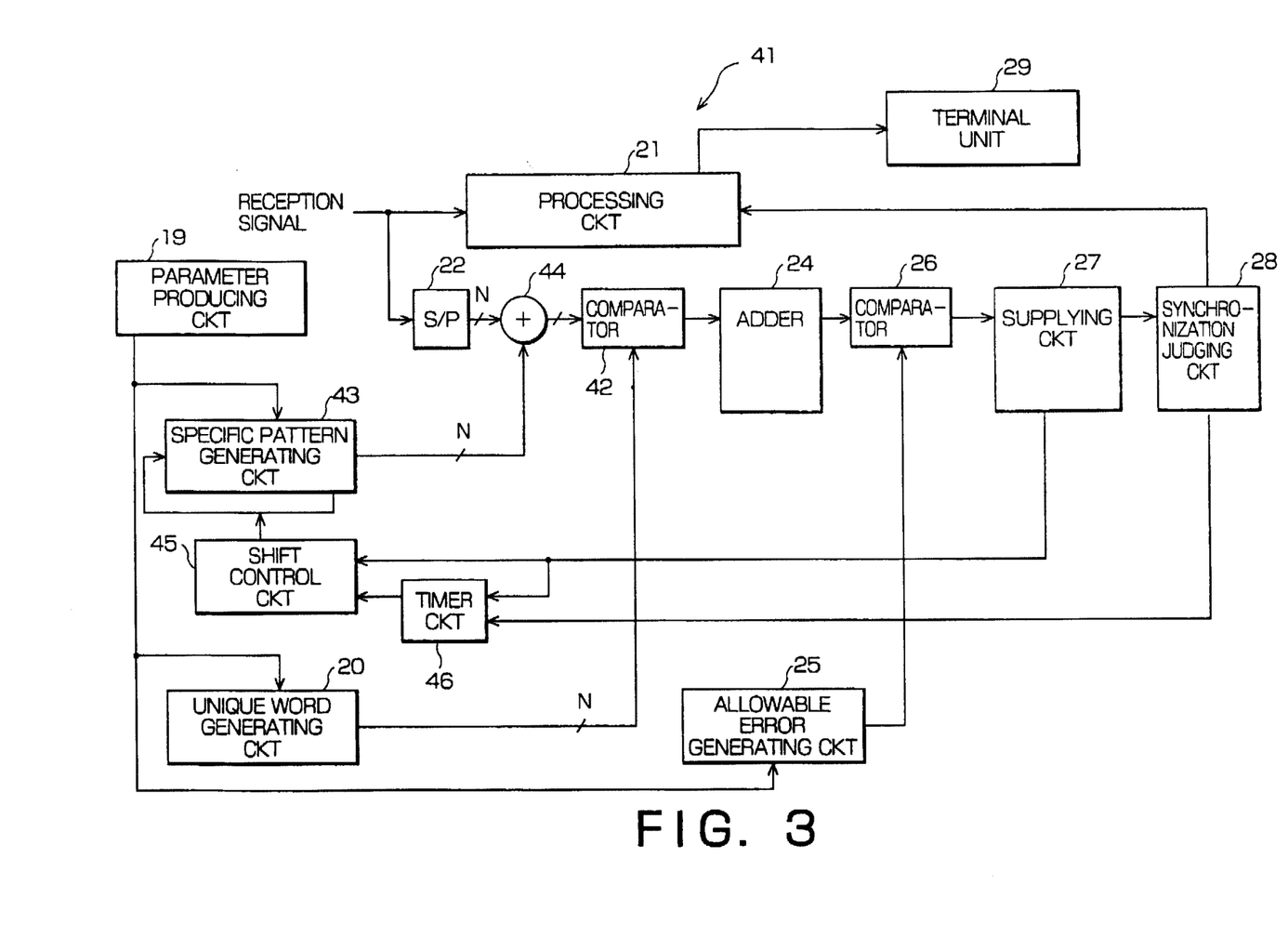
FIG. 3 is a block diagram of a reception section of the data transmission system according to the first embodiment of this invention.

Referring to FIG. 3, attention will be directed to a reception section of the data transmission system according to the first embodiment of this invention. The illustrated reception section is different in structure from the reception section 12 illustrated in FIG. 1 and is therefore designated by a reference numeral 41. The reception section 41 comprises similar parts which are designated by like reference numerals and operable with likewise named and denoted signals.

The reception section 41 comprises a third comparator circuit 42 instead of the first comparator circuit 23 illustrated in FIG. 1. The reception section 41 further comprises a reception specific pattern generating circuit 43, an EX-OR circuit 44, a shift control circuit 45, and a timer circuit 46.

From the transmission section 31 illustrated in FIG. 2, the transmission signal is transmitted to the reception section 41. The reception section 41 receives the transmission signal to demodulate the transmission signal into the reception signal.

As described in conjunction with FIG. 1, the reception signal is supplied to the reception processing circuit 21 and the serial-parallel converter 22. Responsive to the reception signal, the serial-parallel converter 22 carries out the serial-parallel conversion to successively produce the input signal of N bits.

The input signal of N bits is successively supplied from the serial-parallel converter 22 to the EX-OR circuit 44.

The reception parameter producing circuit 19 supplies the reception unique word generating circuit 20 and the reception specific pattern generating circuit 43 with a reception parameter which is equal to the transmission parameter. Responsive to the reception parameter, the reception specific pattern generating circuit 43 generates the first specific pattern to supply the first specific pattern to the EX-OR circuit 44.

The EX-OR circuit 44 carries out the EX-OR between the first specific pattern and the input signal at each bit to produce a first EX-ORed signal of N bits. The first EX-ORed signal is supplied from the the EX-OR circuit 44 to the third comparator circuit 42.

As described above, the reception parameter is further supplied from the reception parameter producing circuit 19 to the reception unique word generating circuit 20. Responsive to the reception parameter, the reception unique word generating circuit 20 generates the predetermined unique word of N bits in parallel. The predetermined unique word is supplied from the reception unique word generating circuit 20 to the third comparator circuit 42.

The third comparator circuit 42 compares the first EX-ORed signal with the predetermined unique word at each bit. Whenever the bit error exists at each bit between the first EX-ORed signal and the predetermined unique word, the third comparator circuit 42 produces the first error signal representative of the bit error between the first EX-ORed signal and the predetermined unique word. The first error signal is supplied from the third comparator circuit 42 to the adder circuit 24. The adder circuit 24 counts the first error signal to calculate the sum of bit errors. The adder circuit 24 supplies the second comparator circuit 26 with the sum error signal representative of the sum number of the bit errors.

The reception parameter producing circuit 19 supplies the reception parameter to the allowable error generating circuit 25 so that the allowable error generating circuit 25 generates the allowable error signal representative of the allowable number of allowable errors. The allowable error signal is supplied from the allowable error generating circuit 25 to the second comparator circuit 26.

The second comparator circuit 26 compares the sum error signal with the allowable error signal. When the sum number of the bits error is not greater than the allowable number of the allowable errors, the second comparator circuit 26 supplies the comparison result signal to the reception supplying circuit 27. Responsive to the comparison result signal, the reception supplying circuit 27 supplies the unique word detection pulse to the synchronization judging circuit 28, the shift control circuit 45, and the timer circuit 46.

Responsive to the unique word detection pulse, the shift control circuit 45 controls the reception specific pattern generating circuit 43 to carry out the shift of one bit in the first specific pattern. As a result, the reception specific pattern generating circuit 43 produces the second specific pattern. The second specific pattern is supplied to the EX-OR circuit 44 in order to be subjected to the EX-OR between the second specific pattern and the input signal. The EX-OR circuit 44 supplies a second EX-ORed signal to the third comparator circuit 42.

The third comparator circuit 42 compares the second EX-ORed signal with the predetermined unique word at each bit to produce a second error signal representative of the bit error between the second EX-ORed signal and the predetermined unique word. The adder circuit 24 counts the second error signal to calculate the sum of bit errors. The adder circuit 24 supplies the second comparator circuit 26 with the sum error signal representative of the sum number of the bit errors.

The second comparator circuit 26 compares the sum error signal with the allowable error signal. When the sum number of the bits error is not greater than the allowable number of the allowable errors, the second comparator circuit 26 supplies the comparison result signal to the reception supplying circuit 27. Responsive to the comparison result signal, the reception supplying circuit 27 produces the unique word detection pulse.

Responsive to the unique word detection pulse, the shift control circuit 45 controls the reception specific pattern generating circuit 43 to carry out the shift of one bit in the second specific pattern. As a result, the reception specific pattern generating circuit 43 produces the third specific pattern.

As described above, the shift control circuit 45 controls the reception specific pattern generating circuit 43 to carry out the shift of one bit. As a result, the reception specific pattern generating circuit 43 selectively generates the first through the K-th specific patterns.

Once the unique word detection pulse is supplied to the synchronization judging circuit 28, the synchronization judging circuit 28 supplies the reception processing circuit 21 with the synchronization mode signal representative of a synchronization mode after the post guard time duration lapses. The synchronization mode signal is supplied from the synchronization judging circuit 28 to the reception processing circuit 21. Responsive to the synchronization mode signal, the reception processing circuit 21 operates at the synchronization mode to process the reception signal into a processed reception signal which is supplied to the reception terminal unit 29.

When any one of the unique words is not detected, the reception supplying circuit 27 does not produce the unique word detection pulse. Under the synchronization mode, the synchronization judging circuit 28 produces the non-synchronization mode signal when the unique word detection pulse is not supplied to the synchronization judging circuit 28 during the pre-guard time duration. Responsive to the non-synchronization mode signal, the reception processing circuit 21 is put out of operation.

On the other hand, the timer circuit 46 starts a count in response to the unique word detection pulse. When a predetermined time duration lapses, the timer circuit 46 produces a count-up signal. The predetermined time duration may be equal to the frame period.

When the non-synchronization mode signal is supplied to the timer circuit 46 before the predetermined time duration lapses, the time circuit 46 becomes an initial state.

Supplied with the count-up signal, the shift control circuit 45 controls the reception specific pattern generating circuit 43 to carry out the shift of one bit.

Figure 4:
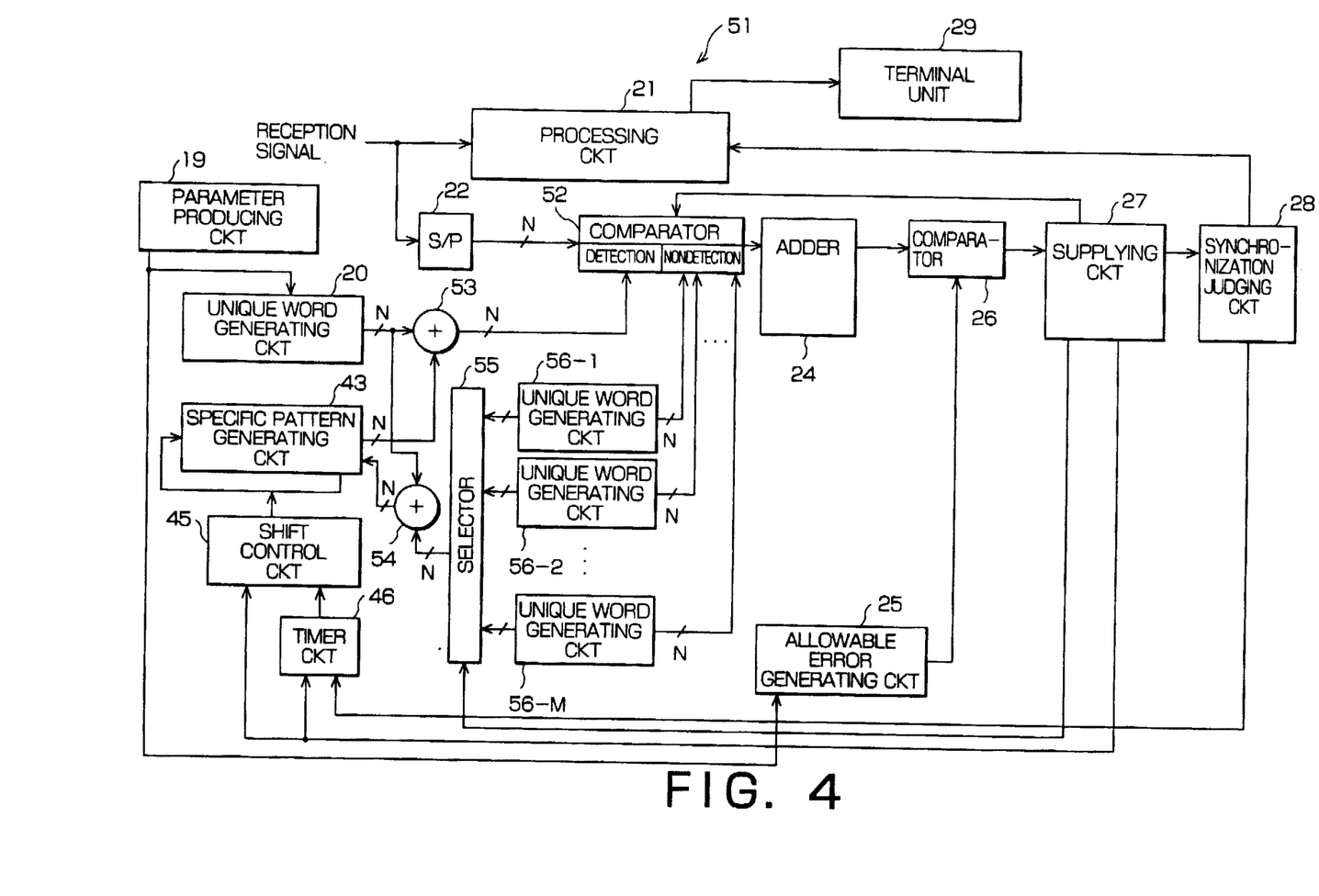
FIG. 4 is a block diagram of a reception section of a data transmission system according to a second embodiment of this invention.

Referring to FIGS. 2 and 4, description will proceed to a data transmission system according to a second embodiment of this invention. The data transmission system comprises the transmission section 31 illustrated in FIG. 2 except that the additional transmission unique word generating circuit 32 generates one of first through M-th subsidiary unique words as the first specific pattern, where M represents a positive integer which is not greater than the positive integer N. Namely, the transmission specific pattern generating circuit 32 has the first through the M-th subsidiary unique words.

The data transmission system comprises a reception section illustrated in FIG. 4. The illustrated reception section is different in structure from the reception section 41 illustrated in FIG. 3 and is therefore designated by a reference numeral 51.

The reception section 51 comprises similar parts which are designated by like reference numerals and operable with likewise named and denoted signals. In the reception section 51, the adder circuit 24, the second comparator circuit 26, and the reception supplying circuit 27 are different in function from the adder circuit, the second comparator circuit, and the reception supplying circuit which are described in conjunction with FIG. 3.

The reception section 51 comprises a fourth comparator circuit 52 instead of the third comparator circuit 42 illustrated in FIG. 3. The reception section 51 further comprises first and second EX-OR circuits 53 and 54, a selector circuit 55, and first through M-th subsidiary unique word generating circuits 56-1 to 56-M.

The first through the M-th subsidiary unique word generating circuits 56-1 to 56-M generate first through M-th subsidiary unique words, respectively. Each of the first through the M-th subsidiary unique words is composed of N bits.

The fourth comparator circuit 52 compares the input signal of N bits with each of the the first through the M-th subsidiary unique words at each bit before the unique word detection pulse is supplied from the reception supplying circuit 27 to the fourth comparator circuit 52. The fourth comparator circuit 52 produces first through M-th subsidiary comparison result signals. The first subsidiary comparison result signal is representative of a bit error between the input signal and the first subsidiary unique word. The second subsidiary comparison result signal is representative of a bit error between the input signal reception signal and the second subsidiary unique word. Similarly, the M-th subsidiary comparison result signal is representative of a bit error between the input signal and the M-th subsidiary unique word.

Each of the first through the M-th subsidiary comparison result signals is supplied to the adder circuit 24. The adder circuit 24 counts each of the first through the M-th subsidiary comparison result signals to calculate a sum of bit errors at each of the first through the M-th subsidiary comparison result signals. The adder circuit 24 supplies the second comparator circuit 26 with first through M-th subsidiary sum signals. The first subsidiary sum signal is representative of a first error sum of bit errors between the input signal and the first subsidiary unique word. The second subsidiary sum signal is representative of a second error sum of bit errors between the input signal and the second subsidiary unique word. Similarly, the M-th subsidiary sum signal is representative of a M-th error sum of bit errors between the input signal and the M-th subsidiary unique word.

The second comparator circuit 26 compares the allowable error signal with each of the first through the M-th subsidiary sum signals. More particularly, the second comparator circuit 26 judges whether or not each of the first through the M-th error sums is not greater than the allowable number of the allowable errors. When the first error sum is not greater than the allowable number of the allowable errors, the second comparator circuit 26 produces a first detection signal.

When the second error sum is not greater than the allowable number of the allowable errors, the second comparator circuit 26 produces a second detection signal. Similarly, the second comparator circuit 26 produces an M-th detection signal when the M-th error sum is not greater than the allowable number of the allowable errors. It will be assumed that each of at least two error sums is not greater than the allowable number of the allowable errors in the first through the M-th error sums. The second comparator 26 selects an error sum having minimum value in the first through the M-th error sums.

It will be assumed that the second comparator circuit 26 produces the first detection signal to supply the first detection signal to the reception supplying circuit 27. The reception supplying circuit 27 supplies a first unique word detection pulse to the fourth comparator circuit 52 and the selector circuit 55.

Responsive to the first unique word detection pulse, the selector circuit 55 selects the first subsidiary unique word generating circuit 56-1 to supply the first subsidiary unique word to the second EX-OR circuit 54.

The second EX-OR circuit 54 is supplied with the predetermined unique word. The second EX-OR circuit 54 carries out an EX-OR between the first subsidiary unique word and the predetermined unique word to produce an initial or specific unique word. The initial unique word is supplied to the reception specific pattern generating circuit 43 to be set as the first specific pattern in the reception specific pattern generating circuit 45.

The first EX-OR circuit 53 is supplied with the first specific pattern and the predetermined unique word. The first EX-OR circuit 53 carries out an EX-OR between the first specific pattern and the predetermined unique word to supply the reception unique word to the fourth comparator circuit 52.

When any one of the first through the M-th unique word detection pulses is supplied to the fourth comparator circuit 52, the fourth comparator circuit 52 stops reception of the first through the M-th subsidiary unique words. The fourth comparator circuit 52 compares the input signal with the reception unique word at each bit.

Whenever the bit error exists at each bit between the input signal and the reception unique word, the fourth comparator circuit 52 produces an error signal representative of a bit error between the input signal and the reception unique word. The adder circuit 24 counts the error signal to calculate the error sum of bit errors. The adder circuit 24 supplies the second comparator circuit 26 with a sum error signal representative of the error sum of the bit errors.

The second comparator circuit 26 compares sum error signal with the allowable error signal. When the error sum is not greater than the allowable number of the allowable errors, the second comparator circuit 26 supplies a detection signal to the reception supplying circuit 27. Responsive to the detection signal, the reception supplying circuit 27 supplies a unique word detection pulse to the synchronization judging circuit 28, the shift control circuit 45, and the timer circuit 46.

Responsive to the unique word detection pulse, the shift control circuit 45 controls the reception specific pattern generating circuit 43 to carry out the shift of one bit in the first specific pattern. As a result, the reception specific pattern generating circuit 43 produces the second specific pattern.

What is claimed is:

1. A data transmission system comprising a transmission section and a reception section connected to said transmission section through a transmission path, said transmission section being responsive to first through K-th data signals to transmit a transmission signal to said reception section, where K represents a positive integer which is greater than one, said reception section producing said first through said K-th data signals in accordance with a reception signal based on said transmission signal, wherein:

said transmission signal has first through K-th frames which carry said first through said K-th data signals and first through K-th transmission unique words, respectively;

said transmission section comprising:

first producing means for producing said first through said K-th transmission unique words in accordance with a predetermined unique word and each of first through K-th specific patterns; and second producing means for producing said transmission signal in accordance with said first through said K-th transmission unique words and said first through said K-th data signals.

2. A data transmission system as claimed in claim 1, wherein said first producing means comprises:

first generating means for generating said predetermined unique word;

second generating means for generating said first through said K-th specific patterns; and exclusive OR means for carrying out an exclusive OR between said predetermined unique word and each of said first through said K-th specific patterns to produce said first through said K-th transmission unique words.

3. A data transmission system as claimed in claim 2, each of said predetermined unique word and said first through said K-th specific patterns having N bits, where N represents a positive integer which is greater than one, wherein said second generating means comprises:

additional generating means for generating a particular unique word of N bits as said first specific pattern; and shift means for shifting said first specific pattern at a predetermined shift value in every period having a predetermined time duration to produce said second through said K-th specific patterns.

4. A data transmission system as claimed in claim 3, wherein said predetermined shift value is equivalent to one bit.

5. A data transmission system as claimed in claim 3, wherein said predetermined time duration is equivalent to a frame period of said transmission signal.

6. A data transmission system as claimed in claim 5, wherein said second producing means comprises:
multiplexing means for multiplexing said first through said K-th unique words to said first through said K-th data signals to produce a multiplexed signal;
modulator means for modulating said multiplexed signal into said transmission signal; and
transmission supplying means for supplying said shift means with a shift control signal every time said frame period lapses.

7. A data transmission system as claimed in claim 1, wherein said reception section comprises:
exclusive OR means for carrying out an exclusive OR between said reception signal and a reception specific pattern to produce an EX-ORed signal;
first comparator means for comparing said EX-ORed signal with said predetermined unique word to produce an error signal;
synchronization judging means for judging whether or not a synchronization is established in accordance with said error signal to produce a synchronization mode signal when said synchronization is established;
processing means responsive to said synchronization mode signal for processing said transmission signal to produce said first through said K-th data signal.

8. A data transmission system as claimed in claim 7, said error signal being representative of a bit error between said EX-ORed signal and said predetermined unique word, wherein said synchronization judging means comprises:
count means for counting said error signal during a unique word length of said reception signal to produce a sum signal representative of an error sum;
second comparator means supplied with said sum signal for comparing said error sum with a predetermined error value to produce a unique word detection signal when said error sum is not greater than said predetermined error value; and
judging means for judging whether or not said synchronization is established in accordance with said unique word detection signal.

9. A data transmission system as claimed in claim 8, wherein said reception specific pattern is equal to said first specific pattern.

10. A data transmission system as claimed in claim 9, wherein said reception section further comprises shift means for shifting a (k−1)-th specific pattern at a predetermined shift value in response to said unique word detection signal to produce a shifted unique word as a k-th specific pattern when said synchronization is established, where k is a variable between two and K (both inclusive).

11. A data transmission system as claimed in claim 10, wherein:
said reception section further comprises timer means responsive to said synchronization mode signal for counting a predetermined time duration to produce a count-up signal when said predetermined time duration lapses, said timer means being reset into an initial state in accordance with said unique word detection signal;
said shift means responsive to said count-up signal for shifting said (k−1)-th specific pattern at said predetermined shift value to produce said k-th specific pattern.

12. A data transmission system as claimed in claim 3, wherein:
said generating circuit selects a particular one of first subsidiary through M-th subsidiary unique words to generate said particular unique word, where M represents a positive integer which is not greater than said positive integer N;
said reception section comprising:
generating means for generating said first through said M-th subsidiary unique words;
first comparator means for comparing said reception signal with each of said first through said M-th subsidiary unique words to produce first through M-th comparison result signals, each of said first through said M-th comparison result signals being representative of a bit error;
count means for counting said each of said first through said M-th comparison result signals during a frame period of said reception signal to produce first through M-th sum signals which are representative of first through M-th error sums;
second comparator means supplied with said first through said M-th sum signals for comparing each of said first through said M-th error sums with a predetermined error value, said second comparator means producing a unique word detection signal representative of a minimum one of said first through said M-th error sums when said first through said M-th error sums are not greater than said predetermined error value;
judging means for judging whether or not a synchronization is established in accordance with said unique word detection signal to produce a synchronization mode signal and;
processing means responsive to said synchronization mode signal for processing said reception signal to produce said first through said K-th data signal.

13. A data transmission system as claimed in claim 12, wherein said reception section further comprises:
selector means responsive to said unique word detection signal for selecting a particular one of said first through said M-th subsidiary unique words;
generating means for generating said predetermined unique word;
first exclusive OR means for carrying out an exclusive OR between said particular unique word and said predetermined unique word to produce a first particular specific pattern;
shift means responsive to said unique word detection signal for shifting a (k−1)-th particular specific pattern at a predetermined shift value to produce a shifted specific pattern as a k-th particular specific pattern, where k is a variable between two and K (both inclusive); and
second exclusive OR means for carrying out an exclusive OR between said k-th particular specific pattern and said predetermined unique word to produce a reception unique word.

14. A data transmission system as claimed in claim 13, wherein:

said first comparator means being responsive to said unique word detection signal for comparing said reception signal with said reception unique word to produce a comparison result signal representative of a bit error;

said count means counting said comparison result signal during a unique word length of said reception signal to produce a sum signal representative of an error sum;

said second comparator means being supplied with said sum signal to compare said error sum with said predetermined error value to produce said unique word detection signal when said error sum is not greater than said predetermined error value.

15. A data transmission system as claimed in claim 14, wherein:

said reception section further comprises timer means responsive to said synchronization mode signal for counting a predetermined time duration to produce a count-up signal when said predetermined time duration lapses, said timer means being reset into an initial state in accordance with said unique word detection signal;

said shift means responsive to said count-up signal for shifting said (k−1)-th specific unique word at said predetermined shift value to produce said K-th specific unique word.

* * * * *